(12) United States Patent
Hyun et al.

(10) Patent No.: US 10,992,478 B2
(45) Date of Patent: Apr. 27, 2021

(54) BLOCKCHAIN-BASED DIGITAL IDENTITY MANAGEMENT METHOD

(71) Applicant: SAMSUNG SDS CO., LTD., Seoul (KR)

(72) Inventors: Nyun Soo Hyun, Seoul (KR); Heung Sik Chae, Seoul (KR); Sang Hyeon Kim, Seoul (KR); Kyung Jin Kim, Seoul (KR); Mun Seok Yang, Seoul (KR); Yeong Min Seo, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 348 days.

(21) Appl. No.: 15/913,456

(22) Filed: Mar. 6, 2018

(65) Prior Publication Data
US 2018/0294966 A1    Oct. 11, 2018

(30) Foreign Application Priority Data
Apr. 5, 2017 (KR) .................. 10-2017-0044323

(51) Int. Cl.
*G06F 21/31* (2013.01)
*H04L 9/32* (2006.01)

(52) U.S. Cl.
CPC .......... *H04L 9/3236* (2013.01); *H04L 9/3226* (2013.01); *H04L 9/3231* (2013.01); *H04L 2209/38* (2013.01)

(58) Field of Classification Search
CPC ............ H04L 63/08; H04L 9/32; G06F 21/31
See application file for complete search history.

(56) References Cited

FOREIGN PATENT DOCUMENTS

| KR | 10-1590076 B1 | 2/2016 | |
| WO | WO-2018144150 A1 * | 8/2018 | ......... H04L 63/0861 |

OTHER PUBLICATIONS

"The Opportunity for Applying Nexledger for Digital Financial Platform," Mar. 2017, Samsung SDS Co., Ltd., 18 pages total.
"Financial Service Innovation Using Digital Identity," Mar. 7, 2017, Samsung SDS Co., Ltd., IT Lab, 56 pages total.

* cited by examiner

*Primary Examiner* — Izunna Okeke
(74) *Attorney, Agent, or Firm* — Sughrue Mion, PLLC

(57) ABSTRACT

A digital identity management method based on a blockchain-based technology is provided. In some exemplary embodiments, the method comprises: performing a first process for storing identity identification information of a subscription request in a first block of a blockchain in response to the subscription request from a service request device and then obtaining a block hash value of the first block as a result of performing the first process, performing a second process for storing the block hash value of the first block and data of authentication information of the subscription request in a second block of the blockchain and then obtaining a block hash value of the second block as a result of performing the second process, and inserting the block hash value of the second block into a digital identity data structure as a result of processing the subscription request.

18 Claims, 21 Drawing Sheets

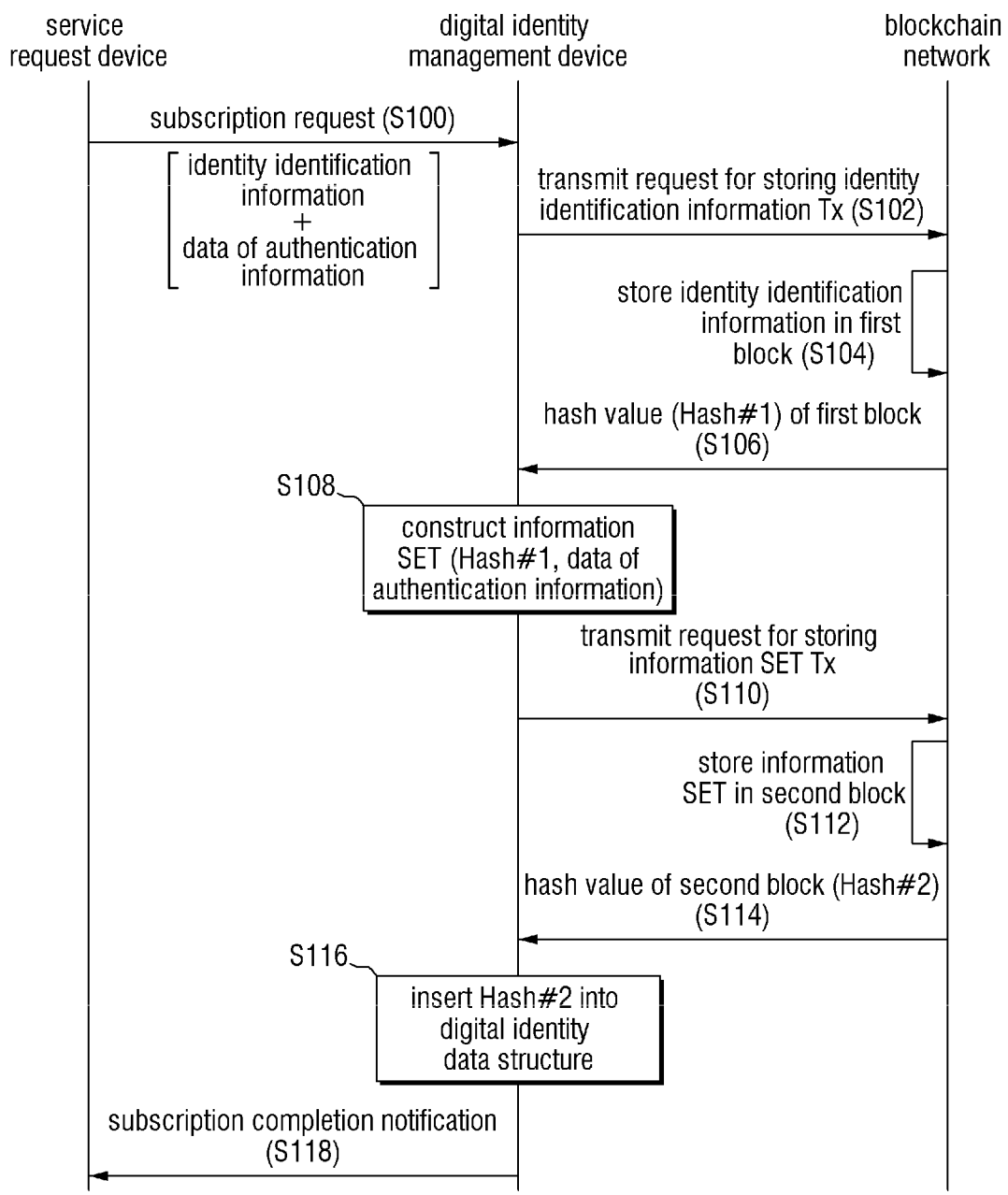

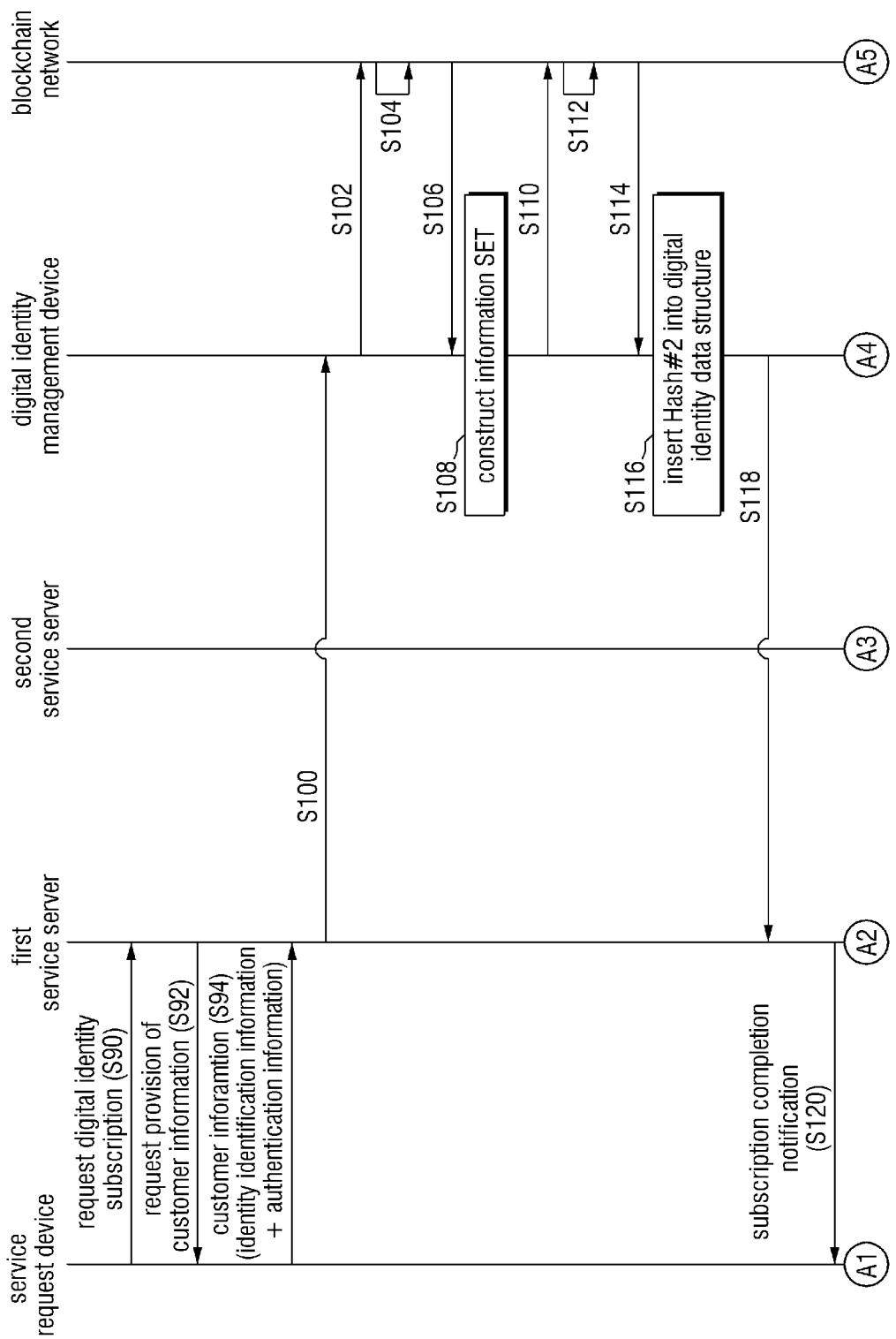

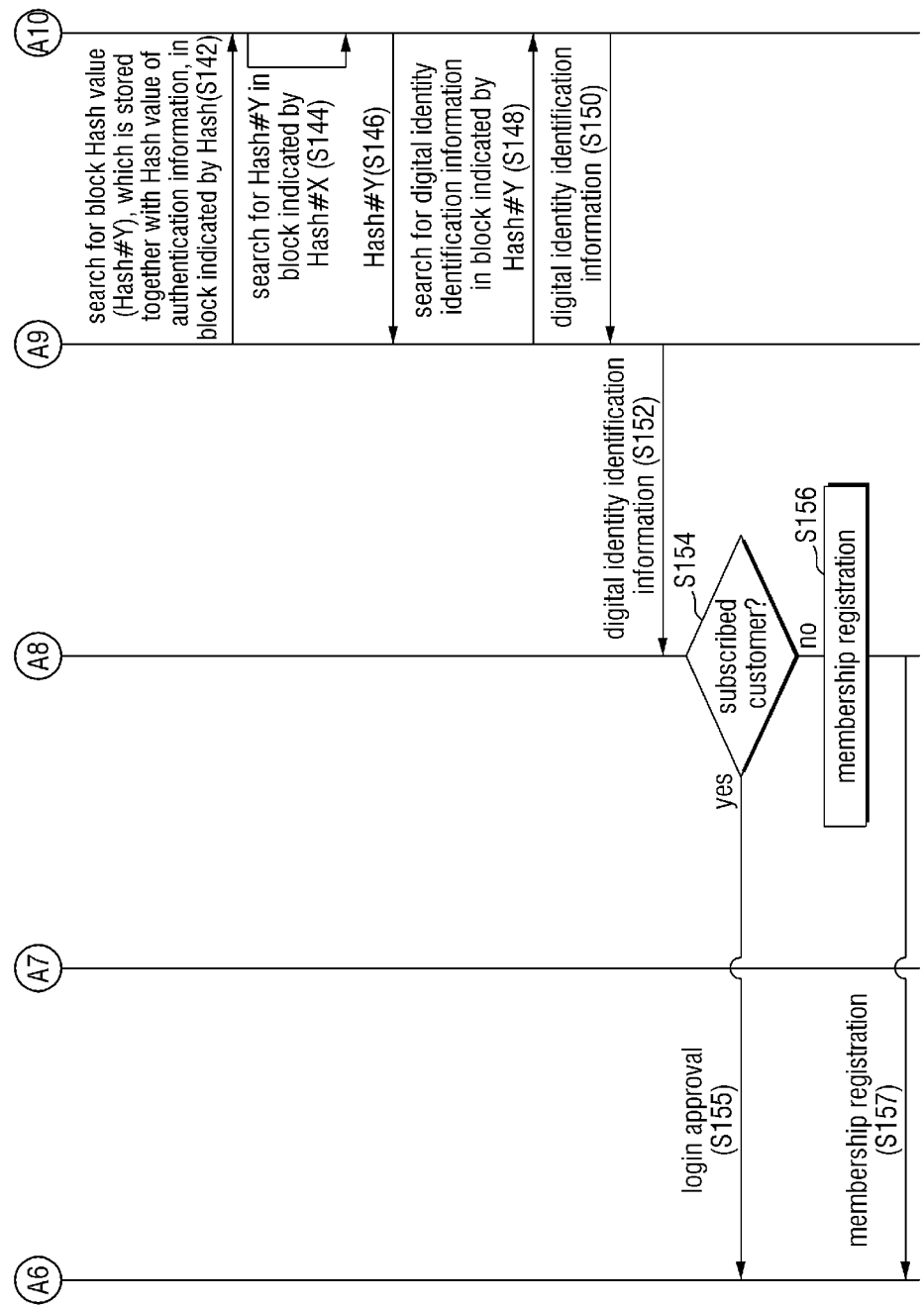

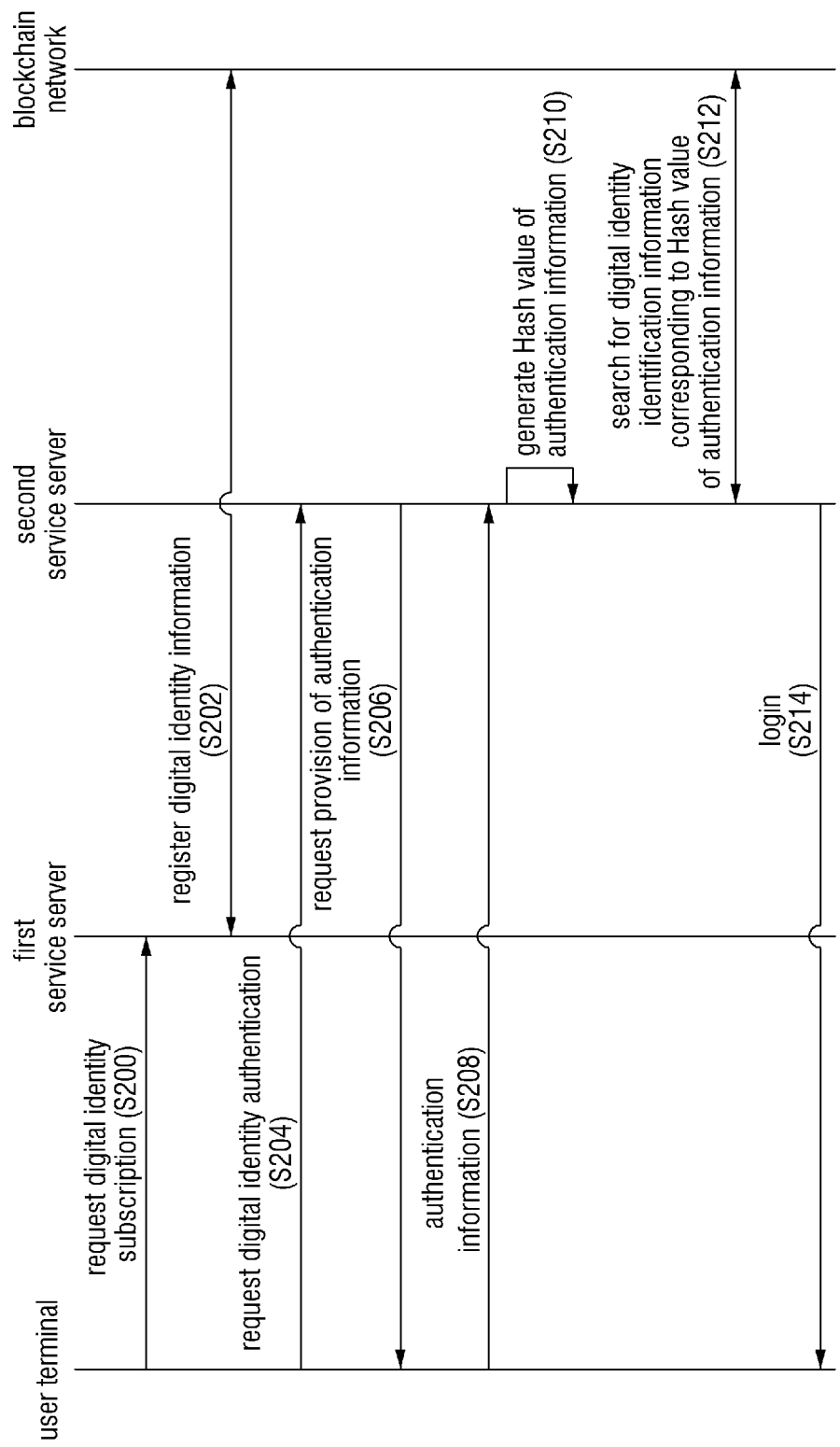

BLOCKCHAIN-BASED DIGITAL IDENTITY MANAGEMENT METHOD

This application claims the benefit of Korean Patent Application No. 10-2017-0044323, filed on Apr. 5, 2017, in the Korean Intellectual Property Office, the disclosure of which is incorporated herein by reference in its entirety.

BACKGROUND

1. Field

The current inventive concept relates to a blockchain-based digital identity management method, and more particularly, to a digital identity management method for improving user convenience and security by performing user authentication using a digital identity based on blockchain technology.

2. Description of the Related Art

A digital identity refers to an identity used in cyberspace by an individual, institution, or electronic device. That is, an individual, an institution, or an electronic device is authenticated using a digital identity. Authentication using a digital identity can be abbreviated to digital authentication. It is very dangerous to store identity information of service users in a centralized device (such as a server) for digital authentication because the centralized device can be a target of hacking. Therefore, it is required to provide a method of managing digital identities using highly secure distributed storage technology such as blockchain.

SUMMARY

Aspects of the inventive concept provide a method and device for managing digital identity related data using blockchain technology.

Aspects of the inventive concept also provide a method and device for improving security by storing digital identity related data using blockchain technology such that authentication information for user authentication and various identification information of a digital identity identified by the authentication information are managed separately.

Aspects of the inventive concept also provide a digital identity management method and device employed to process a subscription request and user registration for a first service provider and then immediately perform user authentication without a subscription request for a second service provider constituting a blockchain network together with the first service provider.

Aspects of the inventive concept also provide a method of providing various services based on a digital identity environment in which a plurality of service providers share digital identities to provide a service-independent user authentication function, and a sales method based on the service provision method.

However, aspects of the inventive concept are not restricted to the one set forth herein. The above and other aspects of the inventive concept will become more apparent to one of ordinary skill in the art to which the inventive concept pertains by referencing the detailed description of the inventive concept given below. In some exemplary embodiments, a blockchain-based digital identity management method comprises: performing a first process for storing identity identification information of a subscription request in a first block of a blockchain in response to the subscription request from a service request device and then obtaining a block hash value of the first block as a result of performing the first process, performing a second process for storing the block hash value of the first block and data of authentication information of the subscription request in a second block of the blockchain and then obtaining a block hash value of the second block as a result of performing the second process, and inserting the block hash value of the second block into a digital identity data structure as a result of processing the subscription request.

In some exemplary embodiments, the data of the authentication information of the subscription request is a hash value of the authentication information of the subscription request. In some exemplary embodiments, the blockchain-based digital identity management method further comprises: after the inserting of the block hash value of the second block into the digital identity data structure as a result of processing the subscription request, receiving a digital identity authentication request comprising the biometric identifier, generating a hash value of the biometric identifier included in the digital identity authentication request, performing a third process for finding a block, e.g., searching for a block, which stores the generated hash value of the biometric identifier, in the blockchain, and transmitting a response to the digital identity authentication request based on the result of performing the third process.

In some exemplary embodiments, the third process comprises a process of searching for the block storing the generating hash value of the biometric identifier among blocks indicated by block hash values included in the digital identity data structure.

In some exemplary embodiments, the digital identity authentication request is received from a user terminal connected to a second service server of a second service provider, and the transmitting of the response to the digital identity authentication request based on the result of performing the third process comprises: if the block storing the generated hash value of the biometric identifier is found as a result of performing the third process, obtaining identity identification information from a block indicated by a block hash value matched and stored with the generated hash value of the biometric identifier in the found block, and transmitting at least part of the obtained identity identification information to the second service server. In some exemplary embodiments, the service request device is a first service server of a first service provider different from the second service provider, and the blockchain is stored, in a distributed manner, in blockchain nodes comprising a computing device managed by the first service provider and a computing device managed by the second service provider.

In some exemplary embodiments, the digital identity management device is a first service server of a first service provider, the service request device is a user terminal connected to the first service server. In some exemplary embodiments, the data of the authentication information of the subscription request is a hash value of the authentication information of the subscription request. In some exemplary embodiments, the blockchain-based digital identity management method further comprises: after the inserting of the block hash value of the second block into the digital identity data structure as a result of processing the subscription request: receiving a digital identity authentication request comprising the biometric identifier from the user terminal by using a second service server of a second service provider different from the first service provider, generating a hash value of the biometric identifier included in the digital identity authentication request by using the second service server, performing a third process for finding a block, e.g., searching for a block, which stores the generated hash value of the biometric identifier, in the blockchain by using the second service server, and transmitting a response to the digital identity authentication request to the user terminal based on the result of performing the third process. In some exemplary embodiments, the blockchain is stored, in a distributed manner, in blockchain nodes comprising a computing device managed by the first service provider and a computing device managed by the second service provider.

In some exemplary embodiments, the inserting of the block hash value of the second block into the digital identity data structure as a result of processing the subscription request comprises: inserting only the block hash value of the second block into the digital identity data structure without inserting the block hash value of the first block into the digital identity data structure, and deleting the block hash value of the first block. In some exemplary embodiments, the inserting of only the block hash value of the second block into the digital identity data structure without inserting the block hash value of the first block into the digital identity data structure comprises: inserting only the block hash value of the second block into the digital identity data structure without inserting both the identity identification information of the subscription request and the block hash value of the first block into the digital identity data structure, and deleting the identity identification information of the subscription request.

In another exemplary embodiment, there is a blockchain-based digital identity management method performed by a digital identity management device, the method including: first storing identity identification information of a subscription request in a first block of a blockchain in response to the subscription request from a service request device and obtaining a block hash value of the first block as a result of the first storing; second storing the block hash value of the first block and data of authentication information of the subscription request in a second block of the blockchain and obtaining a block hash value of the second block as a result of the second storing; and inserting the block hash value of the second block into a digital identity data structure as a result of processing the subscription request.

In yet another exemplary embodiment, there is a digital identify management device including: a processor; a memory which stores instructions to be executed on the processor; and a storage which stores a digital identity data structure, wherein the instructions include: an operation of performing a first process for storing identity identification information of a subscription request in a first block of a blockchain in response to the subscription request from a service request device and obtaining a block hash value of the first block as a result of performing the first process; an operation of performing a second process for storing the block hash value of the first block and data of authentication information of the subscription request in a second block of the blockchain and obtaining a block hash value of the second block as a result of performing the second process; and an operation of inserting the block hash value of the second block into a digital identity data structure as a result of processing the subscription request.

In one exemplary embodiment, there is a non-transitory recording medium storing a computer program implemented as computer-readable code, wherein the computer program includes instructions, the instructions including: an operation of performing a first process for storing identity identification information of a subscription request in a first block of a blockchain and then obtaining a block hash value of the first block as a result of performing the first process; an operation of performing a second process for storing the block hash value of the first block and data of authentication information of the subscription request in a second block of the blockchain and then obtaining a block hash value of the second block as a result of performing the second process; and an operation of inserting the block hash value of the second block into a digital identity data structure as a result of processing the subscription request.

BRIEF DESCRIPTION OF THE DRAWINGS

These and/or other aspects will become apparent and more readily appreciated from the following description of the exemplary embodiments, taken in conjunction with the accompanying drawings in which:

FIG. 7 is a first signal flowchart illustrating a digital identity management method according to an exemplary embodiment;

FIGS. 8A through 8C are a second signal flowchart illustrating a digital identity management method according to an exemplary embodiment;

FIG. 9 is a third signal flowchart illustrating a digital identity management method according to an exemplary embodiment;

DETAILED DESCRIPTION

Figure 1:
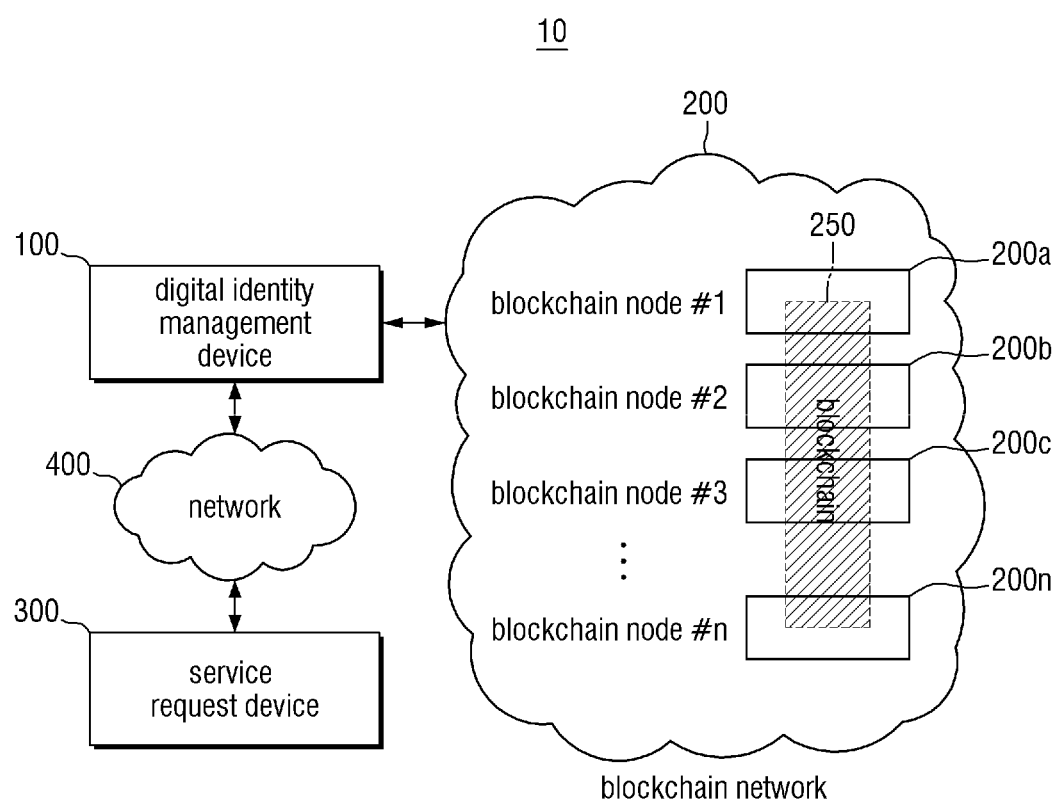
FIG. 1 is a first block diagram of a digital identity management system according to an exemplary embodiment.

Advantages and features of the disclosure and methods of accomplishing the same may be understood more readily by reference to the following detailed description of exemplary embodiments and the accompanying drawings. The disclosure may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the disclosure will only be defined by the appended claims. Like reference numerals refer to like elements throughout the specification.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise.

Hereinafter, exemplary embodiments will be described with reference to the attached drawings.

The configuration and operation of a blockchain-based digital identity management system 10 according to an exemplary embodiment will now be described with reference to FIGS. 1 through 3. Referring to FIG. 1, the digital identity management system 10 according to the current exemplary embodiment may include a service request device 300, a digital identity management device 100, and a blockchain network 200.

The service request device 300 is a computing device that transmits data related to a request for membership subscription and authentication to the digital identity management device 100.

The digital identity management device 100 is a computing device that stores at least one of identity identification information of a subscription request and authentication information of the subscription request in the blockchain network 200 in response to the subscription request of the service request device 300.

The blockchain network 200 includes a plurality of blockchain nodes 200a, 200b, 200c, ..., 200n. The blockchain nodes 200a, 200b, 200c, ..., 200n store a blockchain 250 in a distributed manner by reflecting a replication factor. The replication factor may be a preset static value or a dynamic value that is dynamically changed depending on the situation.

In an exemplary embodiment, the digital identity management device 100 may operate as one of the blockchain nodes 200a, 200b, 200c, ..., 200n included in the blockchain network 200.

The identity identification information refers to various information indicating a person, institution or device identified by a digital identity. The identity identification information may be, for example, personal information (such as a name, an address, a school and a work address) of a person. In addition, the identity identification information may be, for example, a unique identifier of a terminal of the person. The unique identifier of the terminal of the person may be, for example, an international mobile equipment identity (IMEI).

The authentication information refers to all types of digital data that can be used as a unique identifier of a person, institution or device identified by a digital identity. The authentication information may be, for example, a biometric identifier of a person. The biometric identifier may be, for example, any one of a fingerprint, iris information, vein information, voice print information, and a face recognition feature value. The authentication information may also be a personal information number (PIN). In this case, since there are cases where a PIN of a first user and a PIN of a second user are identical, an authentication request including a PIN may include identification information of a person to be authenticated.

In a first exemplary embodiment, the digital identity management device 100 stores only the identity identification information of the subscription request in the blockchain network 200 and stores the authentication information of the subscription request in itself. In this case, the digital identity management device 100 may store a block hash value of a block storing the identity identification information matched with the authentication information, together with the authentication information. According to the current exemplary embodiment, since the digital identity management device 100 can quickly retrieve the authentication information, it can quickly respond to an authentication request including the authentication information from the service request device 300.

In a second exemplary embodiment, the digital identity management device 100 stores only the authentication information of the subscription request in the blockchain network 200 and stores the identity identification information of the subscription request in itself. In this case, the digital identity management device 100 may store a block hash value of a block storing the authentication information matched with the identity identification information, together with the authentication information. According to the current exemplary embodiment, the possibility that the authentication information will be leaked can be minimized.

In a third exemplary embodiment, the digital identity management device 100 stores both the identity identification information and the authentication information of the subscription request in the blockchain network 200 without leaving both the identity identification information and the authentication information of the subscription request in itself. In this case, the digital identity management device 100 may store and manage a block hash value of a block, which stores the identity identification information and the authentication information of the subscription request, in a digital identity data structure.

In a $(3-1)^{th}$ exemplary embodiment, the digital identity management device 100 stores both the identity identification information and the authentication information of the subscription request in different blocks of the blockchain network 200. In this case, the identity identification information is stored in a first block, and a block hash value of the first block and data of the authentication information are stored together in a second block different from the first block. The data of the authentication information may be a hash value of the authentication information.

Figure 2:
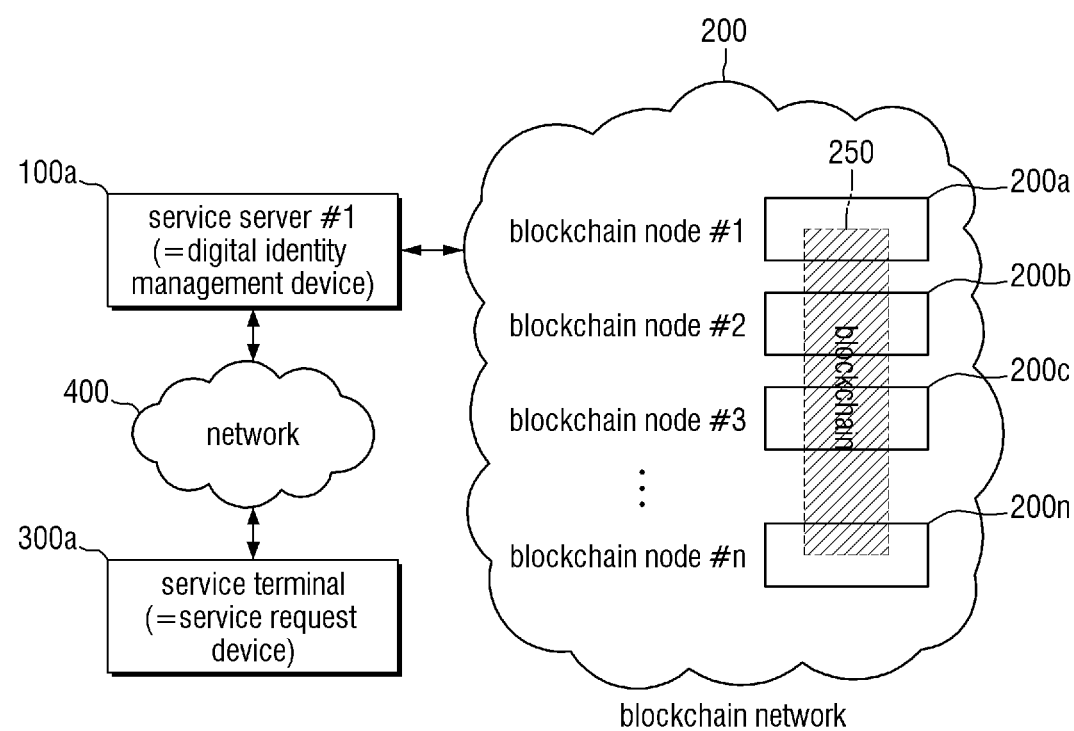
FIG. 2 is a second block diagram of a digital identity management system according to an exemplary embodiment.

Referring to FIG. 2, in an exemplary embodiment, the service request device 300 is a terminal 300a of an end user, and the digital identity management device 100 is a service server 100a. The service server 100a may be, for example, a community service server, an Internet banking service server, a bulletin board service server, or an online game service server that provides online services to members of a managed group. Here, it can be understood that a software module for digital identity management is installed in the service server 100a. The software module for digital identity management supports an input/output (I/O) function for the blockchain network 200.

Figure 3:
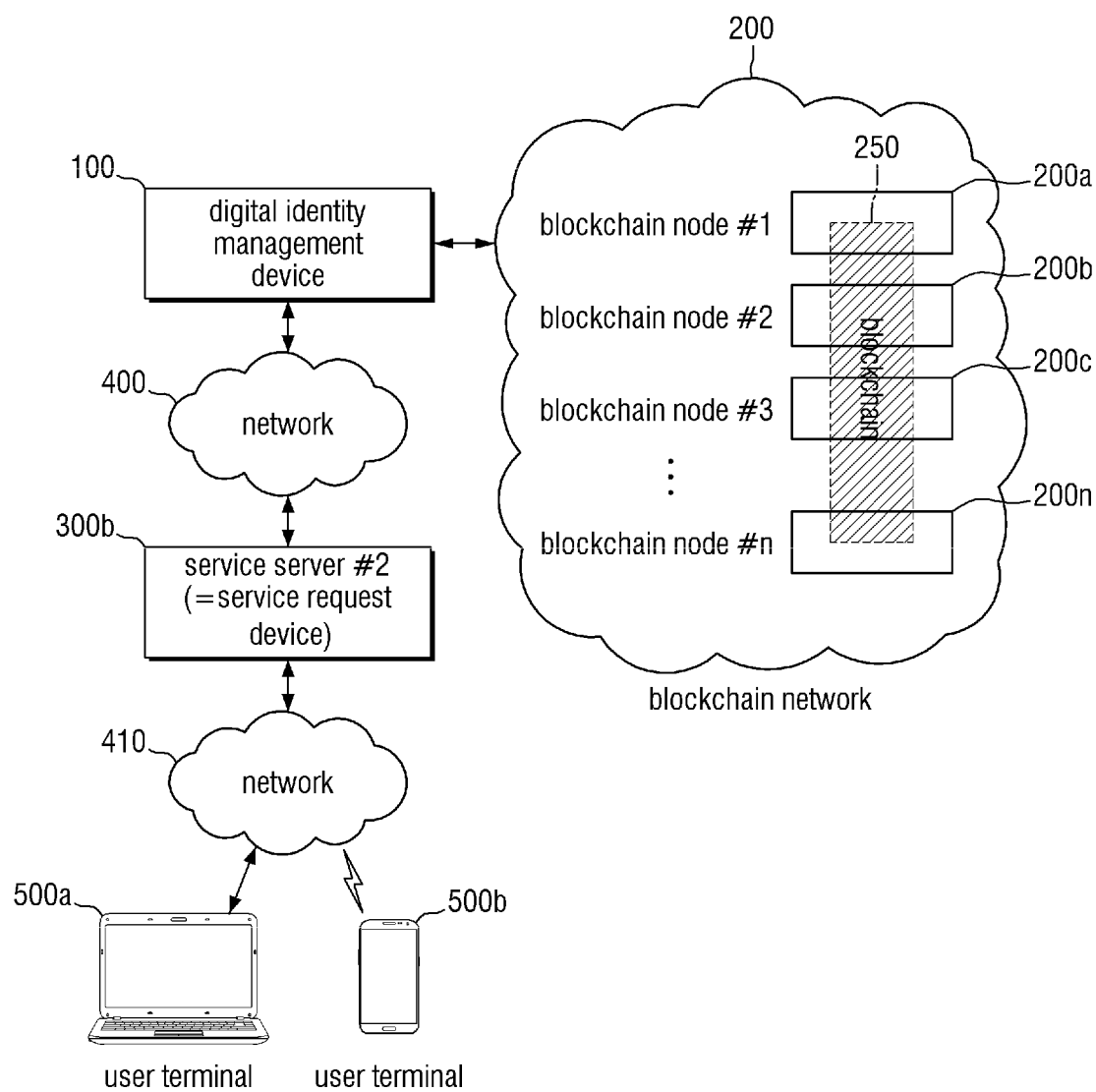
FIG. 3 is a third block diagram of a digital identity management system according to an exemplary embodiment.

Referring to FIG. 3, in an exemplary embodiment, the service request device 300 is a service server 300b. That is, the digital identity management device 100 independent of the service server 300b can be provided. The service server 300b is connected to one or more user terminals 500a and 500b through a network 410. Here, it can be understood that a software module for digital identity management is installed in the digital identity management device 100. The software module for digital identity management supports the I/O function for the blockchain network 200.

Figure 4:
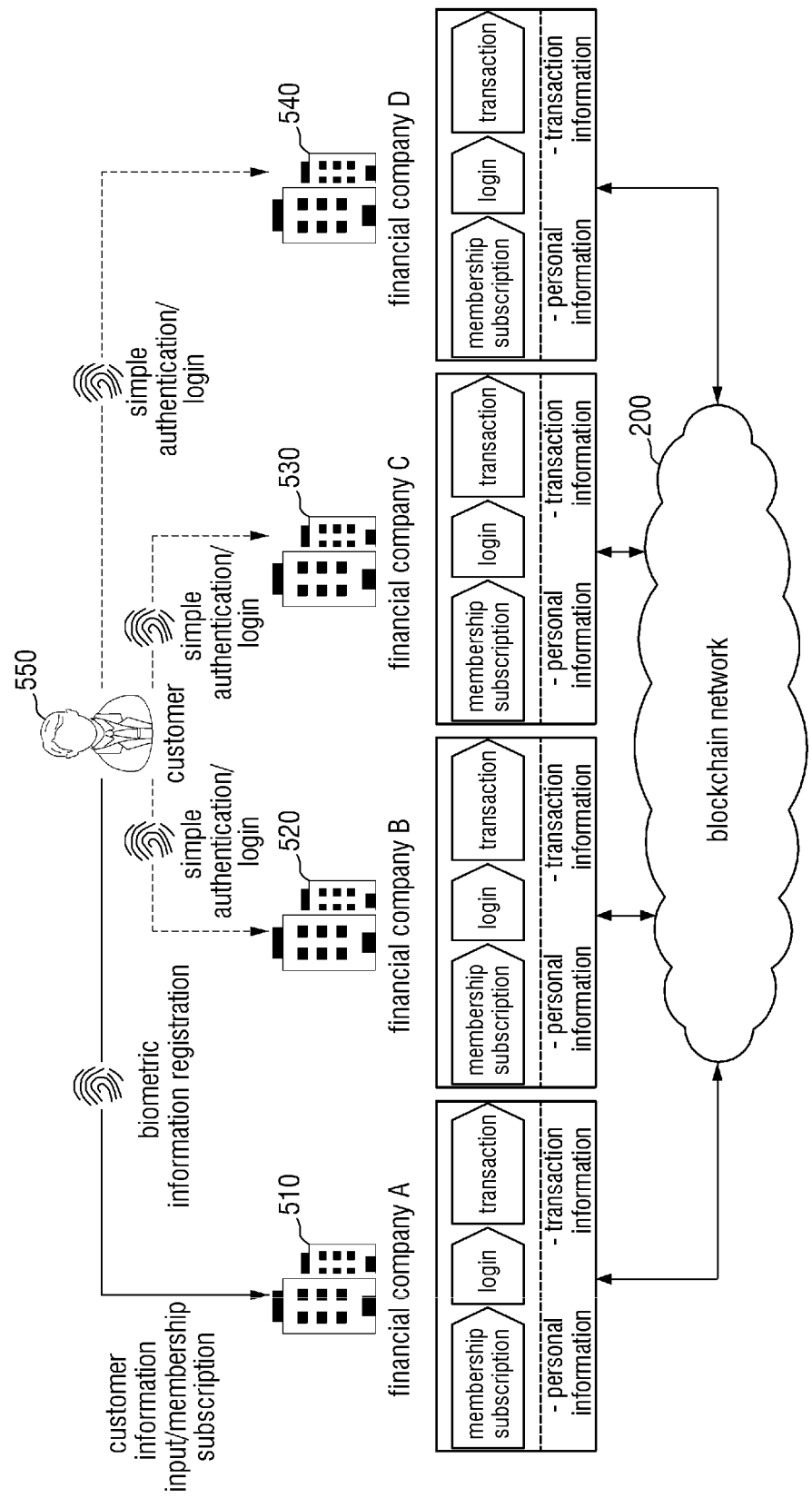
FIGS. 4 and 5 illustrate digital identity environments providing a service-independent user authentication function which can be implemented.

Referring to FIG. 4, if the digital identity management system 10 according to the current exemplary embodiment described above with reference to FIGS. 1 through 3 is utilized, a customer 550 subscribing to a system of a first institution 510 can be authenticated for other institutions 520, 530 and 540 without going through a membership subscription procedure for the institutions 520, 530 and 540. This is possible because the institutions 510, 520, 530 and

540 are all connected to the blockchain network 200 and share digital identity information through the blockchain network 200.

Figure 5:
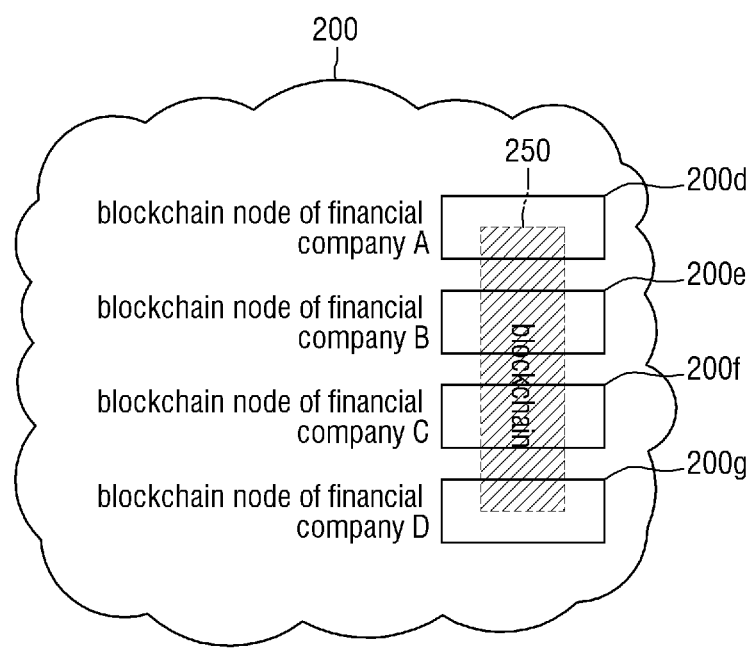

According to an exemplary embodiment, institutions that can share digital identity information may be limited to institutions that provide nodes to the blockchain network 200. Referring to FIG. 5, four institutions 510, 520, 530 and 540 provide blockchain nodes 200d, 200e, 200f and 200g which store, in a distributed manner, a blockchain 250 for storing digital identity information and share the digital identity information with each other. If blockchain nodes storing a blockchain are limited to computing devices operated by institutions using information stored in the blockchain, efforts to maintain the physical and computational security of the blockchain nodes can be assured.

Digital identity sharing models of digital identity management systems according to exemplary embodiments will now be described with reference to FIGS. 6A through 6C. Customer identification information 600 illustrated in FIGS. 6A through 6C is data including digital identity information and authentication information described above.

Figure 6A:
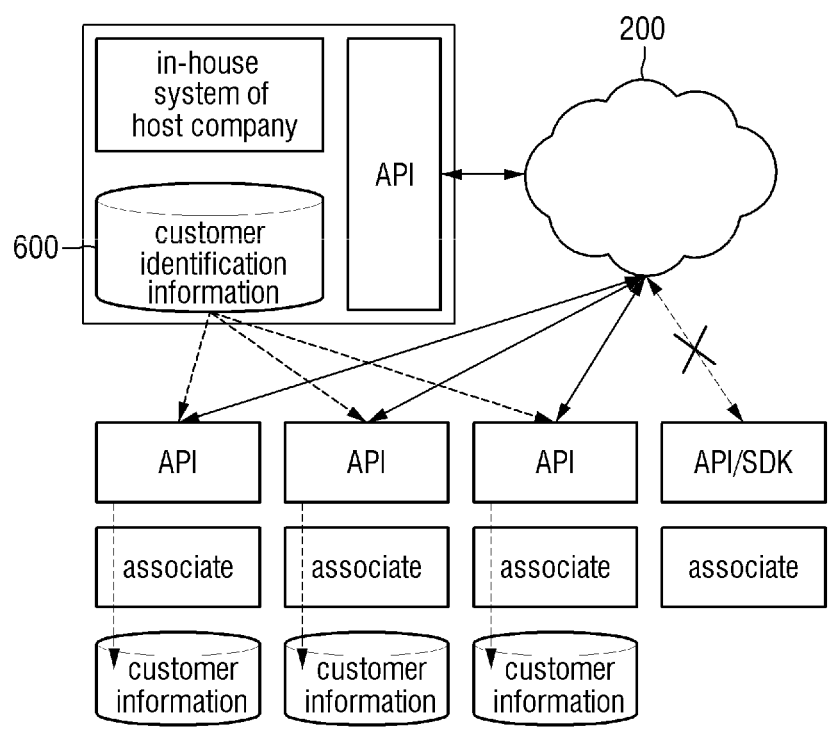
FIGS. 6A through 6C illustrate digital identity sharing models of digital identity management systems according to an exemplary embodiment.

In a first model, referring to FIG. 6A, the customer identification information 600 is stored in an in-house system of a host company complete with security measures. A blockchain network 200 is used to authenticate associate devices that wish to access the customer identification information 600. That is, the authentication of the associate devices is performed using authentication information of the associate devices stored in the blockchain network 200 in a distributed manner. Thus, security is ensured. The associate devices can access the customer identification information 600 after being authenticated through the blockchain network 200 by using an application programming interface (API) distributed by the host company. Here, it is clear that a device of an institution which is not an associate company cannot access the customer identification information 600.

Figure 6B:
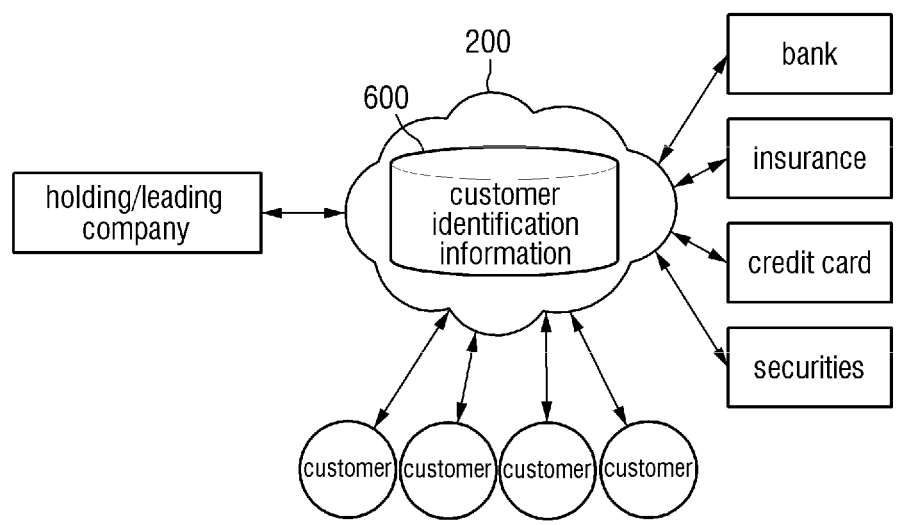

In a second model, referring to FIG. 6B, the customer identification information 600 is stored in the blockchain network 200 in a distributed manner. The blockchain network 200 may be composed of blockchain nodes of a plurality of institutions that wish to access the customer identification information 600. In FIG. 6B, a financial holding company and related companies such as banks, insurance companies, credit card companies and securities companies share the customer identification information 600. Information about blocks in a blockchain that stores the customer identification information 600 of each customer may be managed by the financial holding company.

Figure 6C:
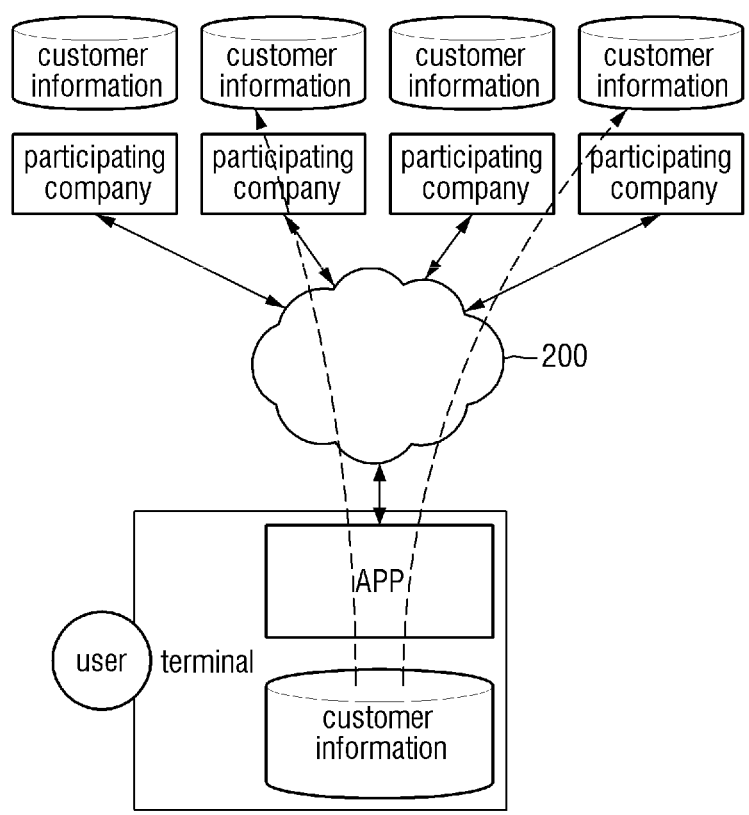

In a third model, referring to FIG. 6C, customer information of a customer is stored in a user terminal of the customer, and only a necessary part of the customer information is provided in an encrypted state to participating companies through the blockchain network 200. Here, the blockchain network 200 is used for encryption and decryption of customer information and key management related to the encryption and decryption.

A blockchain-based digital identity management method according to an exemplary embodiment will now be described with reference to FIGS. 7 through 9. First, a method of registering a blockchain-based digital identity will be described with reference to FIG. 7.

A digital identity management device receives a subscription request from a service request device (operation S100). In an exemplary embodiment, the subscription request may include identity identification information and data of authentication information. In an exemplary embodiment, the subscription request may include a first request including the identity identification information and a second request including data expressing the authentication information. The data expressing the authentication information may be, for example, data packaged with fingerprint information. The data expressing the authentication information can be used to restore the original fingerprint information. In an exemplary embodiment, the second request may be a hash value of the authentication information. In an exemplary embodiment, the second request may be sent with a time gap from the first request.

The digital identity management device performs a first process for storing the identity identification information included in the subscription request. The first process is a process for storing the identity identification information in a first block of a blockchain. The first process includes transmitting a request for the storage of the identity identification information from the digital identity management device to a blockchain network (operation S102), so that the blockchain network can store the identity identification information in the first block (operation S104) and, as a result, the digital identity management device can read a block hash value (Hash #1) of the first block (operation S106).

The digital identity management device constructs an information set (operation S108). The information set is composed of the block hash value of the first block and the data of the authentication information of the subscription request. If the data of the authentication information of the subscription request is data expressing the authentication information, the digital identity management device generates a hash value of the data expressing the authentication information and constructs the information set composed of the block hash value of the first block and the hash value of the data expressing the authentication information. On the other hand, if the data of the authentication information of the subscription request is a hash value of the data expressing the authentication information, the digital identity management device constructs the information set composed of the block hash value of the first block and the authentication information of the subscription request.

In an exemplary embodiment, the information set may further include a transaction ID of the first block which includes the identity identification information.

The digital identity management device performs a second process for storing the information set. The second process is a process for storing the information set in a second block of the blockchain. The second process includes transmitting a request for the storage of the information set from the digital identity management device to the blockchain (operation S110), so that the blockchain network can store the information set in the second block (operation S112) and, as a result, the digital identity management device can read a block hash value (Hash #2) of the second block (operation S114).

The digital identity management device manages a digital identity data structure. Managing the digital identity data structure may include inserting new data into the digital identity data structure, deleting some of the existing data, and updating some of the existing data. The digital identity data structure may be implemented as one of the widely known data structures such as a stack, a queue, a tree and a list or may be accessed through a database management system (DBMS).

The digital identity management device inserts the block hash value of the second block into the digital identity data structure (operation S116). Here, the block hash value of the second block and first information may be matched with each other and then inserted into the digital identity data structure. The first information may be an identifier of the subscription request (e.g., a serial number assigned to the subscription request), data that can be used as a unique identifier of a subscription requester (e.g., an ID designated by the subscription requester) among the identity identification information, or data that can be used as a unique identifier of the data of the authentication information. For example, if the data of the authentication information is a hash value of fingerprint data of the subscription requester, the first information may be a hash value of the hash value. The first information can be understood as information that can function as an identifier of the subscription requester.

In an exemplary embodiment, the block hash value of the second block and a transaction ID storing the identity identification information in the first block may be matched with each other and then inserted into the digital identity data structure. The transaction ID can be read when the digital identity management device reads the hash value of the first block from the blockchain network (operation S106). Even if the digital identity data structure is leaked by hacking or the like, since the block (first block) in which the transaction ID is valid and the block (second block) indicated by the block hash value are different from each other, identity identification information of users can still be protected.

In an exemplary embodiment, the block hash value of the second block, the first information, and the transaction ID storing the identity identification information in the first block may be matched with each other and then inserted into the digital identity data structure.

In an exemplary embodiment, the transaction ID storing the identity identification information in the first block may be stored not in the digital identity data structure, but in the second block together with the block hash value of the first block.

The digital identity management device transmits a subscription completion notification to the service request device (operation S118) as a response to the subscription request (operation S100).

A digital identity management method according to an exemplary embodiment will now be described with reference to FIGS. 8A through 8C. The current exemplary embodiment includes a series of operations performed in a case where a user who made a digital identity-based subscription request to a first institution operating a first service server makes a user authentication request to a second service server in order to use a service of a second institution operating the second service server.

First, referring to FIG. 8A, a user terminal transmits a digital identity subscription request to the first service server (operation S90), and the first service server requests the user terminal to provide customer information (operation S92). Then, the user terminal transmits customer information including input identity identification information and a predetermined type of authentication information for authenticating a user of the user terminal to the first service server (operation S94). The first service server transmits the digital identity subscription request to a digital identity management device (operation S100). Subsequent operations S102, S104, S108, S110, S112, S114, S116 and S118 related to digital identity information registration and performed by the digital identity management device have been described above with reference to FIG. 7. The first service server transmits a subscription completion notification message to the user terminal (operation S120).

Figure 8B:
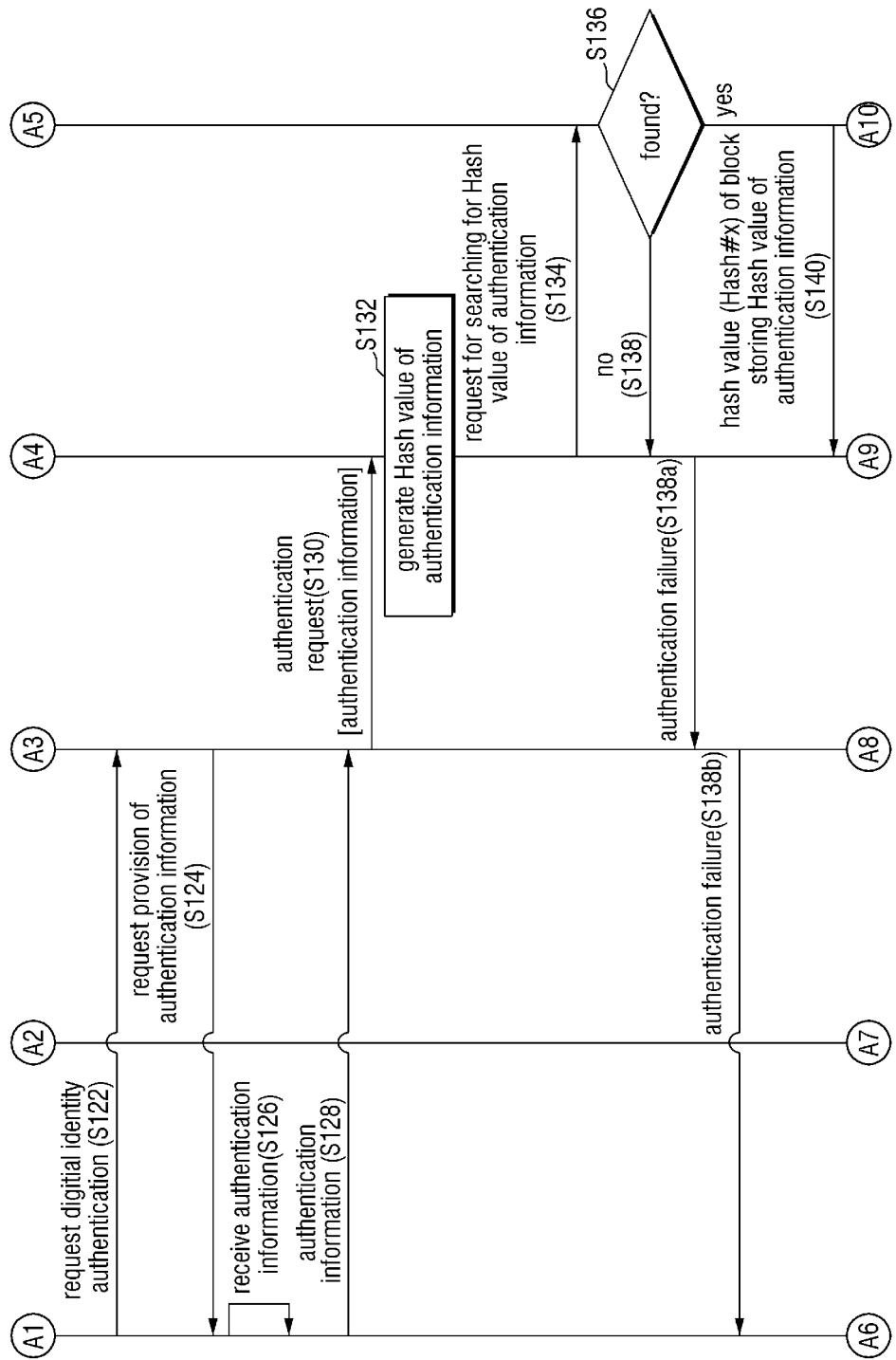

Next, referring to FIG. 8B, when the user terminal requests the second service server to authenticate the user of the user terminal using a digital identity (operation S122), the second service server requests the user terminal to provide authentication information of a predetermined type or authentication information of a type appropriate to the situation (operation S124). The user terminal receives authentication information of the requested type (operation S126) and transmits the received authentication information to the second service server (operation S128).

The second service server transmits an authentication request including data about the authentication information to the digital identity management device (operation S130). When receiving the authentication request, the digital identity management device generates a hash value of the data of the authentication information included in the authentication request (operation S132). Then, the digital identity management device performs a third process for providing identity identification information corresponding to the generated hash value of the authentication information to the second service server.

The third process includes making a search request (operation S134) to obtain a block hash value of a block including the generated hash value of the authentication information among blocks included in a blockchain and, as a result, reading the block hash value of the block including the generated hash value of the authentication information (operation S140). In an exemplary embodiment, the search for the block including the generated hash value of the authentication information is requested in the third process by designating only block hash values stored in the digital identity data structure among the blocks included in the blockchain. Therefore, the time required for search can be minimized.

If the authentication information included in the received authentication request is not found in the blockchain, an authentication failure notification is transmitted to the user terminal sequentially via the blockchain network, the digital identity management device, and the second service server (operations S138, S138a, and S138b).

If the authentication information included in the received authentication request is found in the blockchain, the digital identity management device reads the block hash value (Hash #X) of the block storing the hash value of the authentication information from the blockchain network (operation S140). Next, referring to FIG. 8C, the digital identity management device searches for a block hash value, which is stored together with the hash value of the authentication information, in the block indicated by Hash #X in the blockchain network (operation S142). The block hash value stored together with the hash value of the authentication information indicates a block that stores the identity identification information of the user to be authenticated.

The blockchain network searches for block hash value (Hash #Y), which is stored together with the hash value of the authentication information, in the block indicated by Hash #X (operation S144), and, as a result, the digital identity management device reads Hash #Y from the blockchain network (operation S146). The block indicated by Hash #Y is a block that stores the identity identification information of the user to be authenticated. The digital identity management device searches for the digital identity identification information of the user to be authenticated in the block indicated by Hash #Y (operation S148). A plurality of pieces of digital identity identification information may be stored in the block indicated by Hash #Y and may be assigned transaction IDs, respectively. Therefore, in order to find or search for the digital identity identification information of the user to be authenticated in the block indicated by Hash #Y, it is necessary to know a transaction ID including the digital identity identification information. Some exemplary embodiments for obtaining the transaction ID will now be described.

In an exemplary embodiment, the transaction ID may be obtained from the digital identity data structure. As described above, the digital identity management device may match and store, in the digital identity data structure, the block hash value of the block storing the hash value of the authentication information, the first information functioning as a unique identifier of the user to be authenticated, and the transaction ID including the identity identification information in the block storing the digital identity identification information. Therefore, if the authentication request received by the digital identity management device includes the authentication information together with the unique identifier of the user, the transaction ID can be obtained from the digital identity data structure.

In an exemplary embodiment, if the block hash value of the block storing the identity identification information and the transaction ID are stored together, the transaction ID can be obtained from the block storing the hash value of the authentication information.

Through the above-described process, the digital identity management device receives the user's identity identification information, which is indicated by the authentication information received together with the authentication request, from the blockchain network (operation S150). The digital identity management device transmits at least part of the received identity identification information to the second service server. The digital identity management device may determine the range of identity identification information to be transmitted to the second service server based on information such as the authority level of the second service server.

The second service server identifies whether the user is a subscribed customer by using the identity identification information received from the digital identity management device (operation S154). If the user is a subscribed customer, the second service server immediately allows the user to log in (operation S155). If the user is not a subscribed customer, the second service server immediately performs a membership registration process using the received identity identification information (operation S156) and then transmits the result of the membership registration to the user terminal (operation S157).

As described above, digital identity management software may be installed in a service server operated by each institution that shares digital identity information through a blockchain. In this case, referring to FIG. 9, digital identity subscription and information registration may be performed through a first service server (operations S200 and S202), and then digital identity authentication may be performed through a second service server. More specifically, the second service server receives an authentication request from a user terminal (operation S204) and requests the user terminal to provide authentication information (operation S206). When receiving the authentication information from the user terminal as a response (operation S208), the second service server generates a hash value of the received authentication information (operation S210) and searches for digital identity identification information corresponding to the generated hash value of the authentication information in a blockchain network (operation S212). The second service server allows the user terminal to log in using the identity identification information received from the blockchain network (operation S214).

Some of the exemplary embodiments described above with reference to FIGS. 7 through 8C may be applied as they are in the process in which the second service server obtains the identity identification information corresponding to the hash value of the authentication information from the blockchain network. For example, if a transaction ID of a first block which stores the identity identification information is stored in a second block, together with a block hash value of the first block and the hash value of the authentication information, the transaction ID of the identity identification information can be obtained from the second block. In addition, if the authentication request from the user terminal includes not only the authentication information but also a user ID, a transaction ID corresponding to the user ID can be obtained from the digital identity data structure. Here, the first service server and the second service server may share the digital identity data structure.

Figure 10:
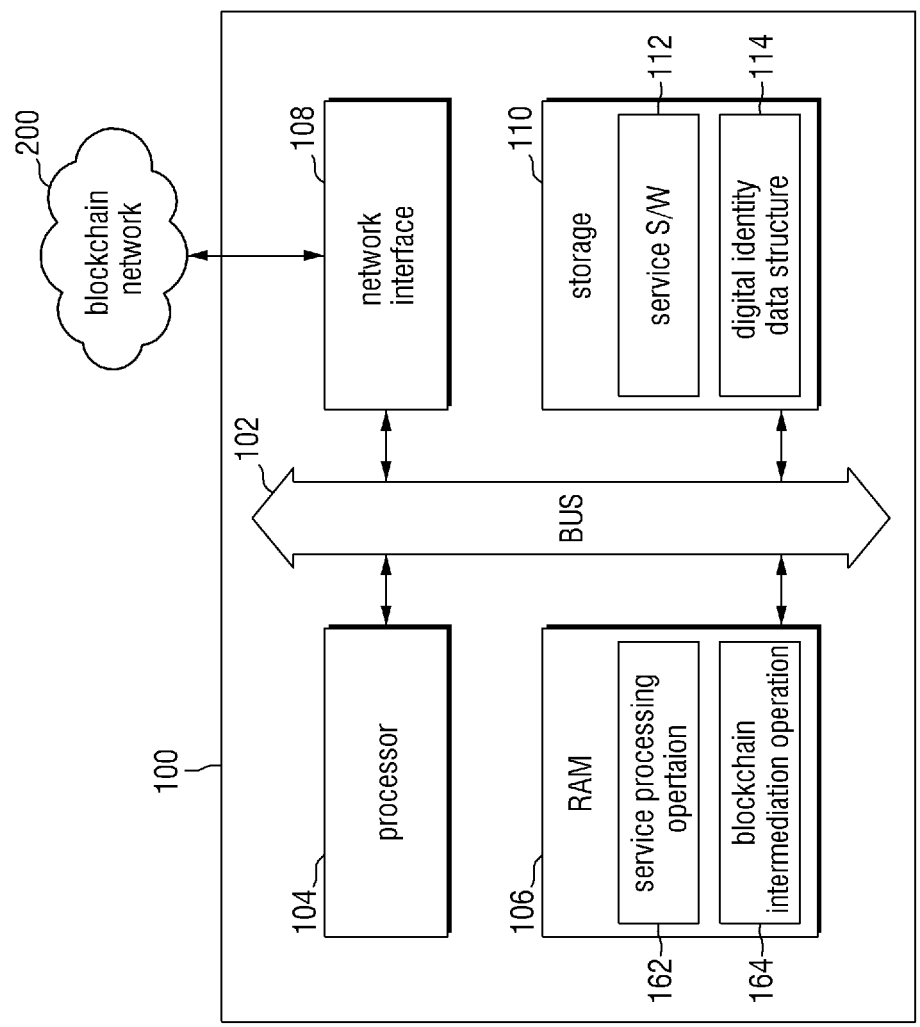
FIG. 10 illustrates the hardware configuration of a digital identity management device according to an exemplary embodiment.

The configuration and operation of a digital identity management device 200 according to an exemplary embodiment will now be described with reference to FIG. 10. Referring to FIG. 10, the digital identity management device 100 according to the current exemplary embodiment includes a processor 104, a network interface 108 connected to a blockchain network 200, a storage 110, a random access memory (RAM) 106, and a system bus 102 which relays data between the processor 104, the network interface 108, the storage 110 and the RAM 106.

Although not illustrated in FIG. 10, the network interface 108 may be connected not only to the blockchain network 200 but also to a service request device through a network such as the Internet.

The storage 110 stores service software 112. The service software 112 is loaded into the RAM 106 to form a service processing operation 162 and a blockchain intermediation operation 164. The blockchain intermediation operation 164 performs operations, such as authentication and encryption/decryption, for data input/output to/from the blockchain network 200. The service processing operation 162 and the blockchain intermediation operation 164 are fetched to and executed on the processor 104.

The storage 114 further stores a digital identity data structure 114. The configuration of the digital identity data structure 114 has already been described above in some exemplary embodiments with reference to FIGS. 1 through 9.

The service processing operation 162 processes a subscription request and an authentication request of the service request device. The method of processing the subscription request and the authentication request has already been described above in some exemplary embodiments with reference to FIGS. 1 through 9.

The methods according to the exemplary embodiments described above can be performed by the execution of a computer program implemented as computer-readable code. The computer program may be transmitted from a first computing device to a second computing device through a network such as the Internet and may be installed in the second computing device and thus used in the second computing device. Examples of the first computing device and the second computing device include fixed computing devices such as a server, a physical server belonging to a server pool for a cloud service, and a desktop PC.

The computer program may be stored in a recording medium such as a DVD-ROM or a flash memory.

Methods of providing a digital service based on a digital identity environment according to exemplary embodiments will now be described with reference to FIGS. 11 through 17.

Figure 11:
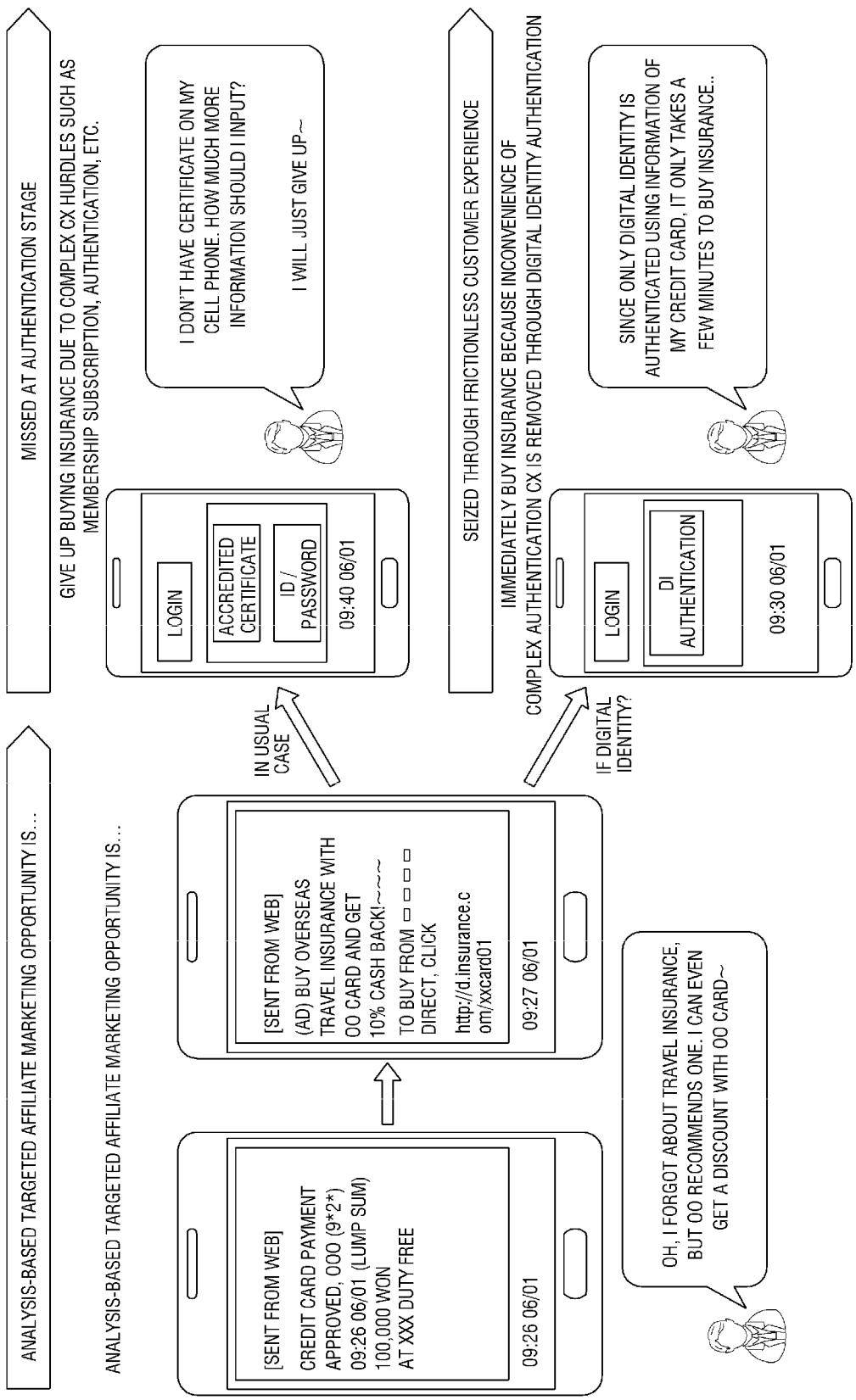
FIGS. 11 through 17 illustrate methods of providing a digital service based on a digital identity environment according to an exemplary embodiment.

FIG. 11 illustrates a method of promoting various online events without customer resistance by utilizing a blockchain-based associate digital identity. Referring to FIG. 11, in the method of providing a digital service according to the current exemplary embodiment, a customer can apply for an online event by simply inputting authentication information such as fingerprint information without having to input additional information for log-in. Therefore, the customer can apply for the event without inconvenience.

Figure 12:
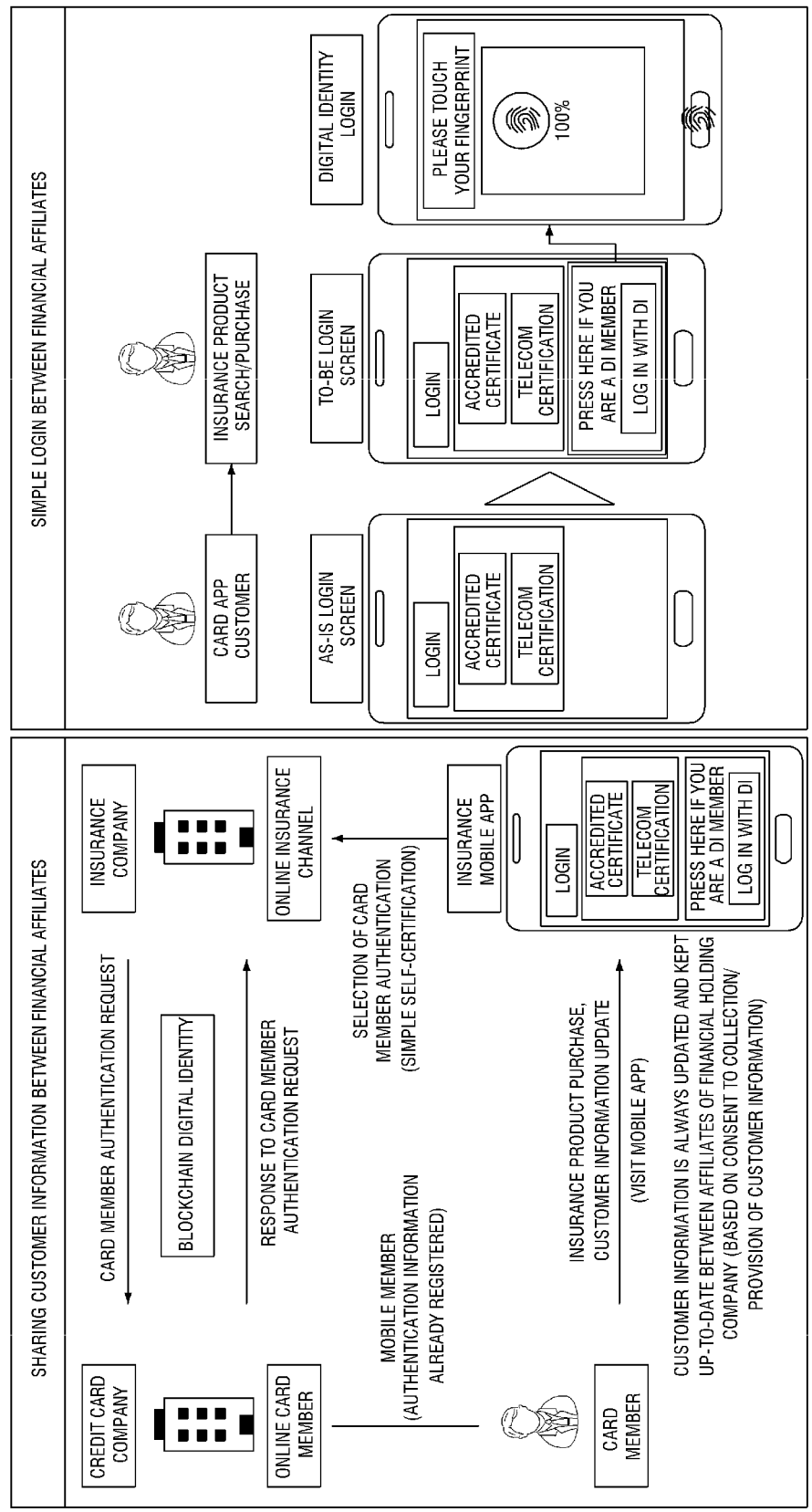
Figure 13:
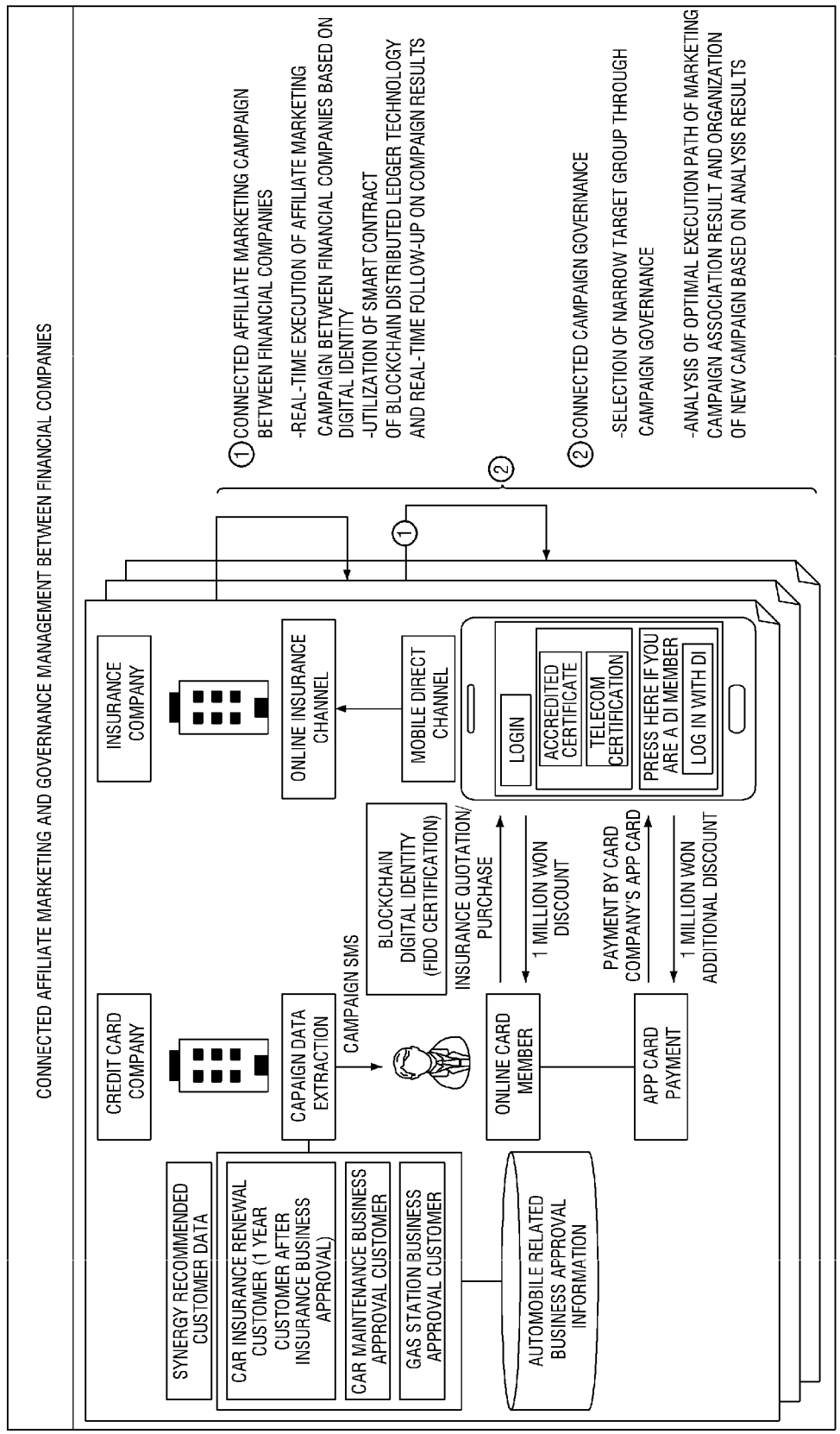

FIG. 12 illustrates a method of providing convenience of financial transactions and expanding a non-facing channel service by utilizing blockchain-based information of each of affiliates or associates of a financial holding company to provide services such as log-in and self-certification to other affiliates. Financial affiliates belonging to the same financial group can cross-authenticate a user by sharing authentication information. In connection with this, FIG. 13 illustrates a method of improving convenience and safety for customers by conducting marketing and promotion activities using a blockchain digital identity between affiliates or associates of a financial holding company and providing financial companies with opportunities to expand sales opportunities and increase sales through digital channels.

Figure 14:
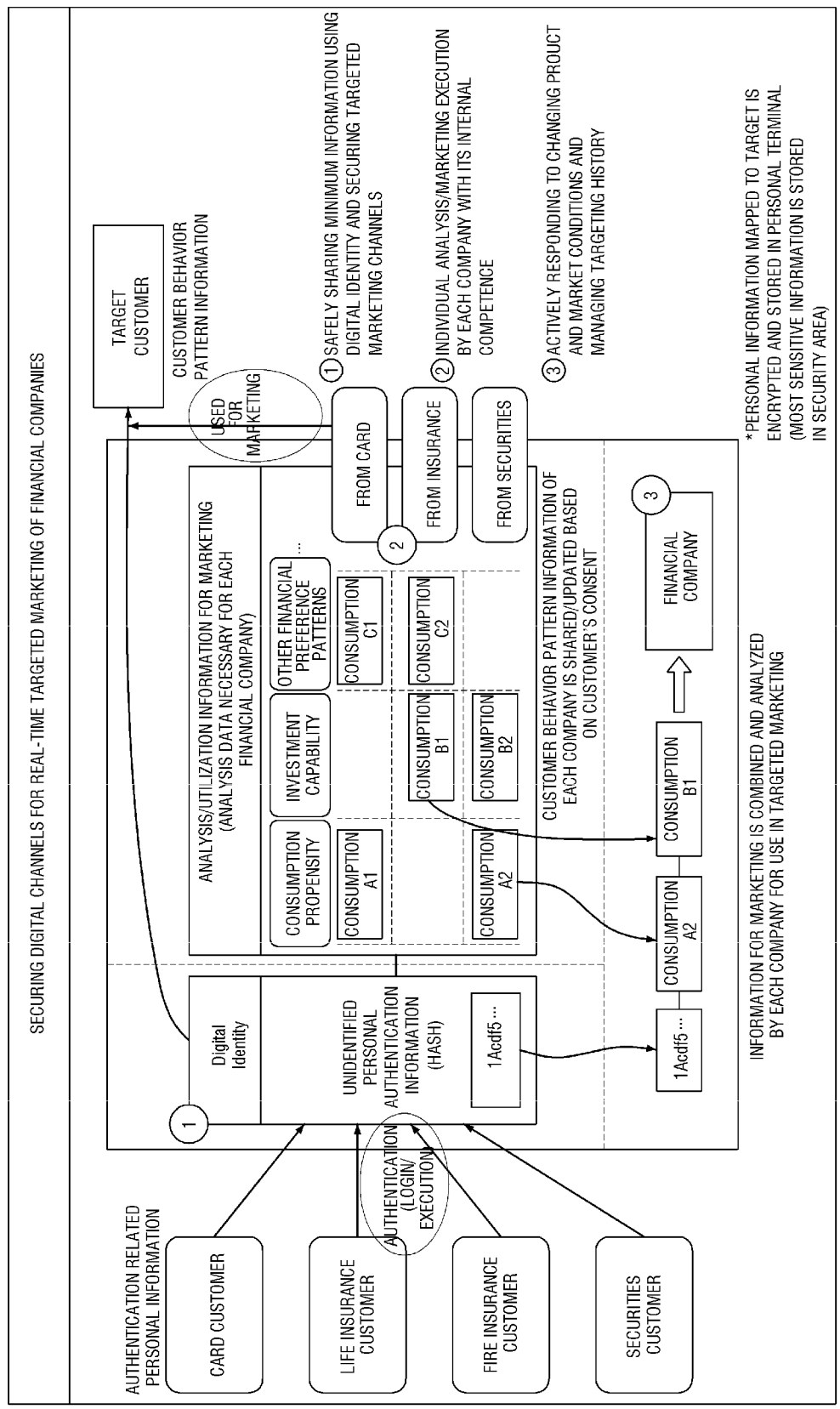

FIG. 14 illustrates a business model that shares information based on the consent and intent of a user by managing various information, such as customers' personal information and usage information, based on a blockchain. By providing non-stereotyped information such as consumption analysis, investment propensities and preference patterns, it is possible to provide information and participate in marketing based on the consent of a customer to the provision of a digital identity. In addition, maximum benefits can be obtained for both companies and customers through targeted marketing from the perspective of the companies and provision of minimum information from the perspective of the customers.

Figure 15:
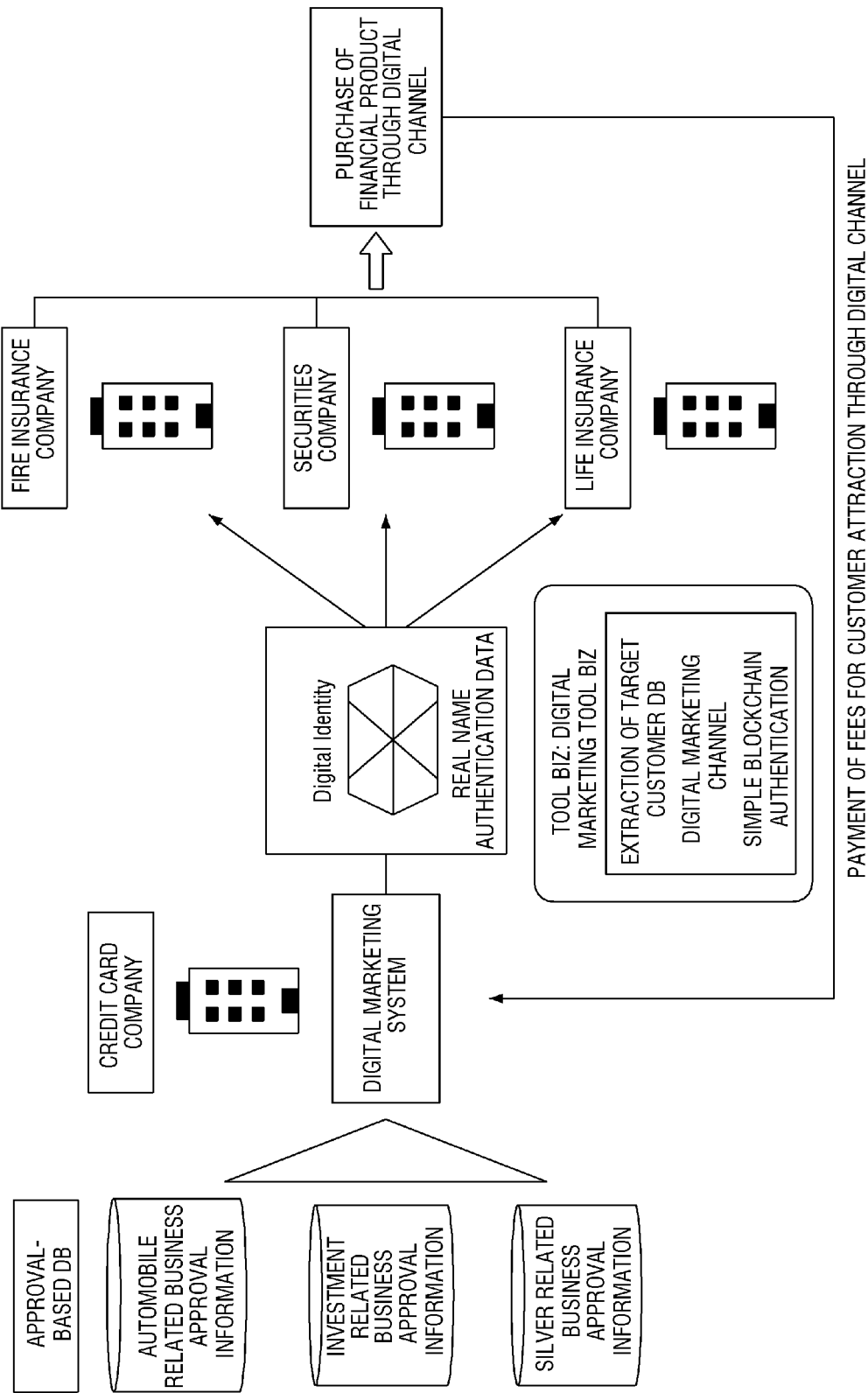

FIG. 15 illustrates a digital marketing tool business model that provides online marketing information for customers by analyzing usage patterns and propensities based on approval data and links the online marketing information with a blockchain-based digital identity to attract members through digital channels of affiliates or associates of a financial holding company. From the perspective of implementing a digital marketing tool, target setting is possible through customer payment pattern analysis and customer propensity data analysis. In addition, it becomes easy to conduct online targeted marketing based on customer data and to establish a digital identity linkage process. Also, a digital financial product attracting model by attracting customers online based on the digital marketing tool is provided.

Figure 16:
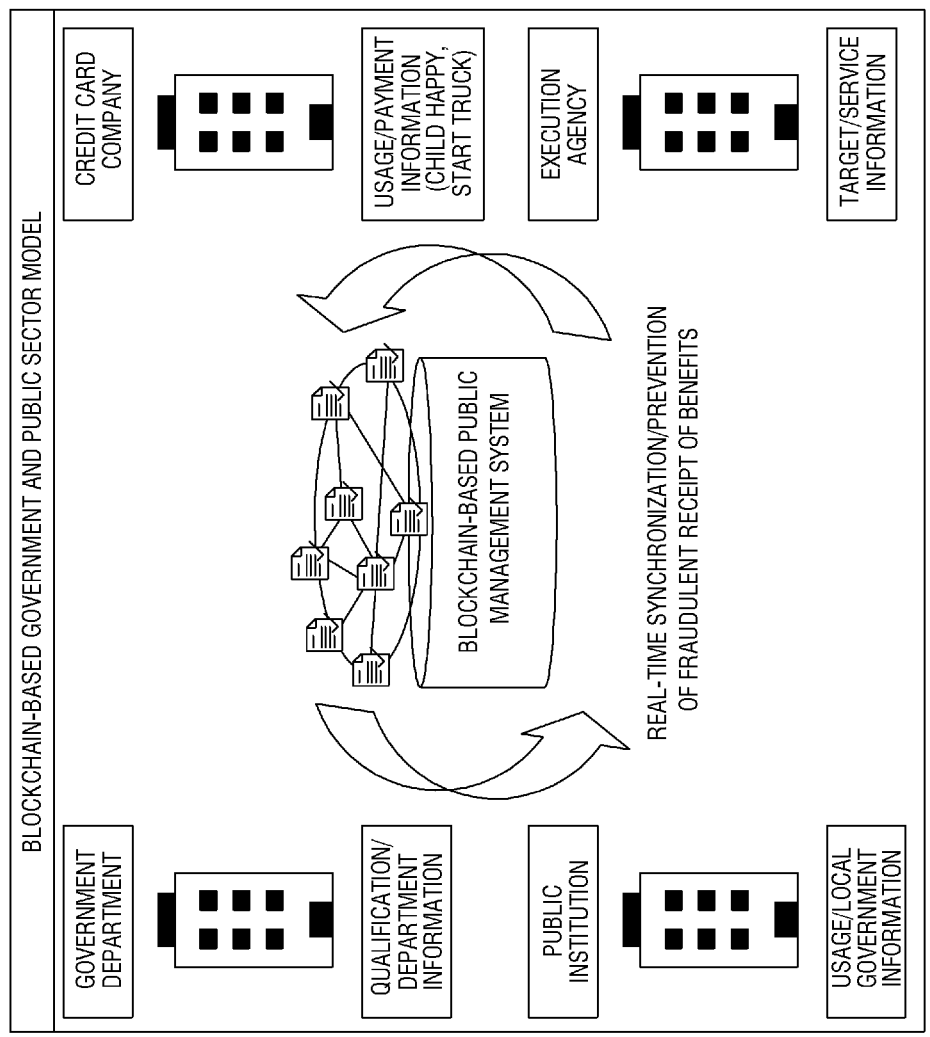

FIG. 16 illustrates a business model for efficiently conducting government and public projects, such as real-time work sharing, transparent management of the government budget, and enhancement of the security of sensitive customer information, by applying a blockchain of an exemplary embodiment to the public service sector.

Figure 17:
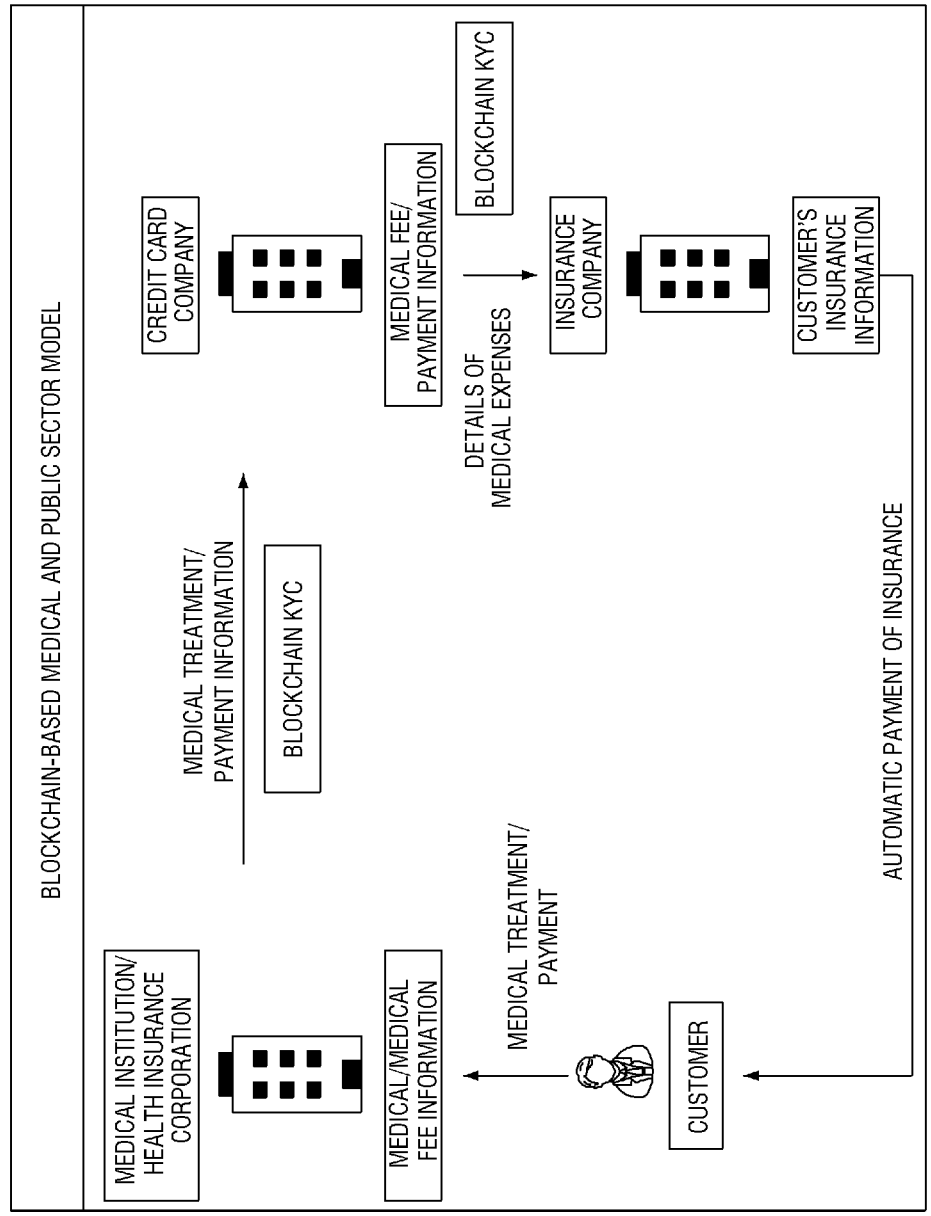

FIG. 17 illustrates a method of improving customer satisfaction and system efficiency of related institutions by quickly and safely automating the payment of insurance and medical expenses supported as a workplace welfare benefit, which were manually applied for and paid, by applying a blockchain of an exemplary embodiment to the medical service sector. The payment of insurance and medical expenses supported by a company, which were manually applied for and paid, can be quickly and safely automated based on a blockchain. In addition, it is possible to reduce cost and improve work efficiency through an automated work process based on the linkage between public institutions. Also, efficient and safe information management is possible through blockchain-based customer information management.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A blockchain-based digital identity management method performed by a digital identity management device, the method comprising:
    first storing identity identification information of a subscription request in a first block of a blockchain in response to the subscription request from a service request device and obtaining a block hash value of the first block as a result of the first storing;
    second storing the block hash value of the first block and data of authentication information of the subscription request in a second block of the blockchain and obtaining a block hash value of the second block as a result of the second storing;
    inserting the block hash value of the second block into a digital identity data structure as a result of processing the subscription request;
    receiving a digital identity authentication request comprising a biometric identifier from a user terminal connected to a second service server of a second service provider;
    generating a hash value of the biometric identifier included in the digital identity authentication request;
    if the block storing the generated hash value of the biometric identifier is found, obtaining identity identification information from a block indicated by a block hash value matched and stored with the generated hash value of the biometric identifier in the found block; and
    transmitting at least part of the obtained identity identification information to the second service server,
    wherein the identity identification information is stored in the first block and is not stored in the second block, and the data of authentication information is not in the first block and is stored in the second block.

2. The method of claim 1, wherein the data of the authentication information of the subscription request is a hash value of the authentication information of the subscription request.

3. The method of claim 1, wherein the authentication information of the subscription request is a biometric identifier for identifying a user who made the subscription request.

4. The method of claim 3, wherein the data of the authentication information of the subscription request is a hash value of the authentication information of the subscription request, the method further comprising:
    searching for a block storing the generated hash value of the biometric identifier, in the blockchain; and
    transmitting the response to the digital identity authentication request based on the searching for the block.

5. The method of claim 4, wherein the searching for the block comprises searching for the block storing the generated hash value of the biometric identifier among blocks indicated by block hash values included in the digital identity data structure.

6. The method of claim 4, wherein the service request device is a first service server of a first service provider that is different from the second service provider, and the blockchain is stored, in a distributed manner, in blockchain nodes, the blockchain nodes including a computing device managed by the first service provider and a computing device managed by the second service provider.

7. The method of claim 3, wherein the digital identity management device is a first service server of a first service provider, the service request device is a user terminal connected to the first service server, the data of the authentication information of the subscription request is a hash value of the authentication information of the subscription request, the method further comprising:
  receiving a digital identity authentication request comprising the biometric identifier from the user terminal by using a second service server of a second service provider that is different from the first service provider;
  generating a hash value of the biometric identifier included in the digital identity authentication request by using the second service server;
  searching for a block storing the generated hash value of the biometric identifier, in the blockchain by using the second service server; and
  transmitting a response to the digital identity authentication request to the user terminal based on the searching for the block,
  wherein the blockchain is stored, in a distributed manner, in blockchain nodes, the blockchain nodes including a computing device managed by the first service provider and a computing device managed by the second service provider.

8. The method of claim 1, wherein the inserting of the block hash value of the second block into the digital identity data structure comprises:
  inserting only the block hash value of the second block into the digital identity data structure without inserting the block hash value of the first block into the digital identity data structure; and
  deleting the block hash value of the first block.

9. The method of claim 8, wherein the inserting of only the block hash value of the second block into the digital identity data structure without inserting the block hash value of the first block into the digital identity data structure comprises:
  inserting only the block hash value of the second block into the digital identity data structure without inserting both the identity identification information of the subscription request and the block hash value of the first block into the digital identity data structure; and
  deleting the identity identification information of the subscription request.

10. A digital identify management device comprising:
  a processor;
  a memory which stores instructions to be executed on the processor; and
  a storage which stores a digital identity data structure,
  wherein the instructions comprise:
    an operation of performing a first process for storing identity identification information of a subscription request in a first block of a blockchain in response to the subscription request from a service request device and obtaining a block hash value of the first block as a result of performing the first process;
    an operation of performing a second process for storing the block hash value of the first block and data of authentication information of the subscription request in a second block of the blockchain and obtaining a block hash value of the second block as a result of performing the second process;
    an operation of inserting the block hash value of the second block into a digital identity data structure as a result of processing the subscription request;
    an operation of receiving a digital identity authentication request comprising a biometric identifier from a user terminal connected to a second service server of a second service provider;
    an operation of generating a hash value of the biometric identifier included in the digital identity authentication request;
    if the block storing the generated hash value of the biometric identifier is found, an operation of obtaining identity identification information from a block indicated by a block hash value matched and stored with the generated hash value of the biometric identifier in the found block; and
    an operation of transmitting at least part of the obtained identity identification information to the second service server,
    wherein the identity identification information is stored in the first block and is not stored in the second block, and
    the data of authentication information is not in the first block and is stored in the second block.

11. The digital identity management device of claim 10, wherein the data of the authentication information of the subscription request is a hash value of the authentication information of the subscription request.

12. The digital identity management device of claim 10, wherein the authentication information of the subscription request is a biometric identifier for identifying a user who made the subscription request.

13. The digital identity management device of claim 12, wherein the data of the authentication information of the subscription request is a hash value of the authentication information of the subscription request, the instructions further comprising:
  an operation of performing a third process for searching for a block, which stores the generated hash value of the biometric identifier, in the blockchain by using the digital identity management device; and
  an operation of transmitting the response to the digital identity authentication request based on the result of performing the third process by using the digital identity management device.

14. The digital identity management device of claim 13, wherein the operation of performing the third process comprises an operation of performing a process of searching for the block storing the generating hash value of the biometric identifier among blocks indicated by block hash values included in the digital identity data structure.

15. The digital identity management device of claim 13, wherein the service request device is a first service server of a first service provider that is different from the second service provider, and the blockchain is stored, in a distributed manner, in blockchain nodes, the blockchain nodes comprising a computing device managed by the first service provider and a computing device managed by the second service provider.

16. The digital identity management device of claim 12, wherein the digital identity management device is a first service server of a first service provider, wherein the service request device is a user terminal connected to the first service server, the data of the authentication information of the subscription request is a hash value of the authentication information of the subscription request, the instructions further comprising;
- an operation of receiving a digital identity authentication request comprising the biometric identifier from the user terminal by using a second service server of a second service provider that is different from the first service provider;
- an operation of generating a hash value of the biometric identifier included in the digital identity authentication request by using the second service server;
- an operation of performing a third process for searching for a block, which stores the generated hash value of the biometric identifier, in the blockchain by using the second service server; and
- an operation of transmitting a response to the digital identity authentication request to the user terminal based on the result of performing the third process,
- wherein the blockchain is stored, in a distributed manner, in blockchain nodes, the blockchain nodes comprising a computing device managed by the first service provider and a computing device managed by the second service provider.

17. The digital identity management device of claim 10, wherein the operation of inserting the block hash value of the second block into the digital identity data structure as a result of processing the subscription request comprises:
- an operation of inserting only the block hash value of the second block into the digital identity data structure without inserting both the identity identification information of the subscription request and the block hash value of the first block into the digital identity data structure;
- an operation of deleting the identity identification information of the subscription request; and
- an operation of deleting the block hash value of the first block.

18. A non-transitory recording medium storing a computer program implemented as computer-readable code, wherein the computer program comprises instructions, the instructions comprising:
- an operation of performing a first process for storing identity identification information of a subscription request in a first block of a blockchain and then obtaining a block hash value of the first block as a result of performing the first process;
- an operation of performing a second process for storing the block hash value of the first block and data of authentication information of the subscription request in a second block of the blockchain and then obtaining a block hash value of the second block as a result of performing the second process;
- an operation of inserting the block hash value of the second block into a digital identity data structure as a result of processing the subscription request;
- an operation of receiving a digital identity authentication request comprising a biometric identifier from a user terminal connected to a second service server of a second service provider;
- an operation of generating a hash value of the biometric identifier included in the digital identity authentication request;
- if the block storing the generated hash value of the biometric identifier is found, an operation of obtaining identity identification information from a block indicated by a block hash value matched and stored with the generated hash value of the biometric identifier in the found block; and
- an operation of transmitting at least part of the obtained identity identification information to the second service server,
- wherein the identity identification information is stored in the first block and is not stored in the second block, and
- the data of authentication information is not in the first block and is stored in the second block.

* * * * *